United States Patent [19]

Farcinade

[11] 4,180,322
[45] Dec. 25, 1979

[54] INTERIOR MEASUREMENT OF ENCLOSED SPACES

[75] Inventor: Michel Farcinade, Geneva, Switzerland

[73] Assignee: Alcyon Equipment S.A., Renens, Switzerland

[21] Appl. No.: 901,865

[22] Filed: May 1, 1978

[51] Int. Cl.² .......................... G01C 3/00; E01B 35/02
[52] U.S. Cl. ............................................ 356/1; 33/338; 246/1 R
[58] Field of Search ....................... 356/1, 4, 5; 246/1; 33/338

[56] References Cited

U.S. PATENT DOCUMENTS

| | | | |
|---|---|---|---|
| 3,168,023 | 2/1965 | Harmon | 356/1 |
| 3,705,772 | 12/1972 | Andreas | 356/5 |
| 3,950,096 | 4/1976 | Aeschlimann et al. | 356/4 |
| 4,063,283 | 12/1977 | Rider et al. | 356/4 |
| 4,113,381 | 9/1978 | Epstein | 356/5 |

*Primary Examiner*—S. C. Buczinski
*Attorney, Agent, or Firm*—Griffin, Branigan & Butler

[57] ABSTRACT

An apparatus for measuring interior profiles of enclosed spaces such as railway tunnels through optical means, achieves greater speed and precision than hitherto known apparatus by using a continuous collimated band of light together with means for maintaining the light band at a constant angle of incidence with the profile to be measured and means for detecting variations of the vertical angle of the light source while the light source and an associated image analyser are moved through the enclosed space.

12 Claims, 13 Drawing Figures

INTERIOR MEASUREMENT OF ENCLOSED SPACES

BACKGROUND OF THE INVENTION

The problem of measuring interior profiles such as tunnels by purely optical means has been discussed in U.S. Pat. No. 3,950,096 (Aeschlimann et al). This patent proposed the use of at least one laser beam to be projected onto a tunnel wall and an image analyser and optical system arranged so as to capture the spot appearing on the wall. The information thus derived is representative of the distance from the tunnel center to the impact point of the laser beam.

In order to obtain information representative of a profile it is necessary either to use a plurality of laser beams or to shift the single laser beam so that it impacts a succession of points. In neither case will there be a continuous profile. Where one laser beam only is utilised, the process will be very slow and perhaps unacceptably so when it is necessary to obtain a series of profiles along the length of a tunnel. Should a plurality of laser beams be employed the cost of the equipment will be increased.

A further problem arises when the tunnel is curved along its length or has an irregular floor surface with variable levels. In the known apparatus where such factors have to be taken into consideration both time and precision of measurement will be lost.

The apparatus of this invention, as in the above-mentioned U.S. patent, employs purely optical means for measuring interior profiles, but in view of its novel conception enables examination of predetermined zones or points as well as complete profiles. In view of its high speed acquisition of data it provides a practicable arrangement for measuring a large number of sections.

In carrying out inspection in respect of a master gauge, the programming possible with the novel system of the invention enables giving of immediate warning should there be risk of collision.

During the sequence of profile measurements, electronic processing converts analog type information from the optical system into digital form capable of being readily stored in adequate memory means. It thus becomes feasible at any desired time to employ standard comparison data to obtain graphical representations of possible deformations of the tunnel at predetermined sections thereof along the measured section.

SUMMARY OF THE INVENTION

In arriving at a solution to the several aspects of the problem as hereinbefore outlined the invention provides a device for the measurement of interior profiles of an enclosed space in which an image analyser is optically coupled to a light source via the profile to be measured in a manner to assure a predetermined proportionality between the dimensions of the projected image and those of the profile to be measured, said light source being associated with a first means adapted to project a continuous collimated band of light toward said profile, second means in association with said first means adapted to direct the horizontal angular position of said first means whereby said collimated band maintains a constant angle of incidence with said profile and third means adapted to detect variations of said light source from a predetermined vertical angle and to provide correction signals to said image analyser.

DETAILED DESCRIPTION OF THE INVENTION

Figure 1:
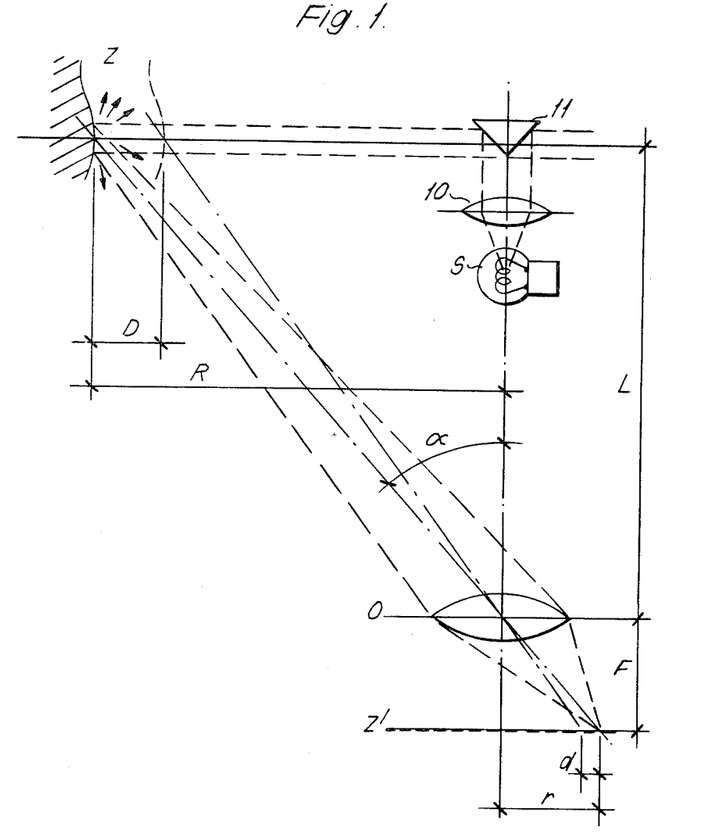
FIG. 1 is a schematic view of the optical system of the present invention.

From FIG. 1 there will be noted a powerful light source S which will preferably be in the form of a group of halogen lamps fanned out over an angle of about 300° so as to provide a continuous luminous trace or band of collimated light which may be modulated in accordance with local requirements. As shown in FIG. 1, the desired effect is obtained when a beam from source S is collimated by lens 10 and directed therefrom to beam splitter cone 11. From cone 11 the beam in the form of a narrow continuous band is projected towards the walls of the enclosure or tunnel where it creates an illuminated zone Z, the albedo of which will depend on the physical state of the wall surface.

Lens O is arranged so as to "see" illuminated zone Z at an angle $\alpha$ and at a fixed distance L from lens O to the center of the collimated beam as projected by the beam splitter cone. An image of illuminated zone Z will thus be projected onto the surface Z' of an opto-electronic receptor enabling measurement of distance r.

It will be evident that variation of the distance D representing tunnel profile variation may be read from the receptor surface Z' in accordance with the optical relationship:

$$G = d/D = r/R = F/L$$

where
- d is at least equal to the resolving power of the optoelectronic receptor;
- r is limited by the physical dimensions of the receptor surface;
- L will be determined by the normal length of available transport means capable of accommodating the apparatus.

Thus d establishes the limit for the smallest detectable variation D and d, r and L establish the maximum radius R capable of measurement.

Figure 2:
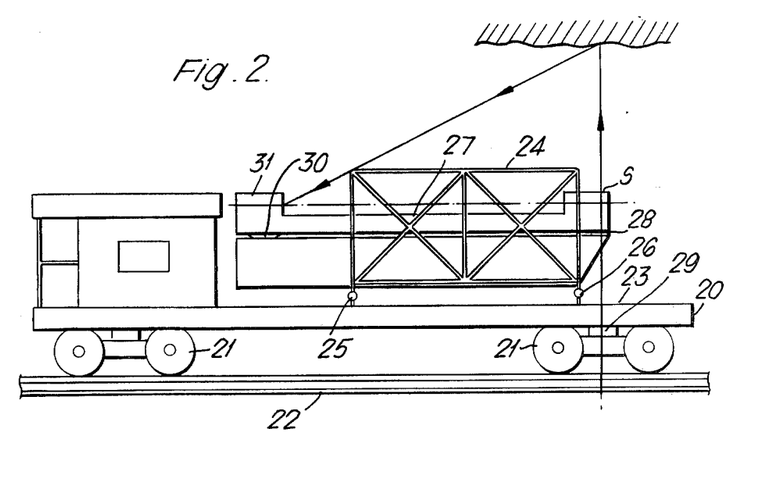
FIG. 2 is a side view of a carriage adapted to the invention.
Figure 3:
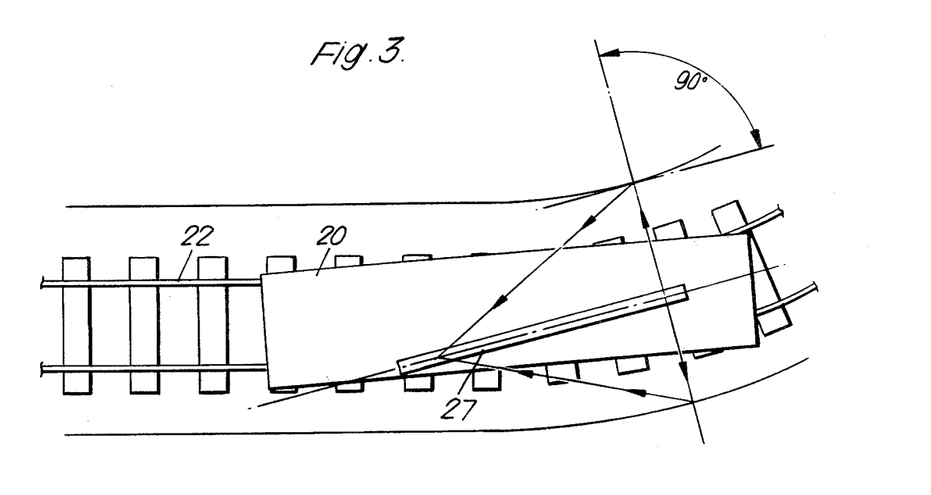
FIG. 3 is a top view of the carriage engaged in a curved passage.

Consider next the transport arrangement as shown in FIGS. 2 and 3. This may comprise for example a standard type of railway flat car 20 provided with the usual bogies 21 and arranged to run on rails 22.

Fixed to the bed 23 of flat car 20 is a lattice framework 24 which may conveniently be formed from perforated metal struts and braces and which is designed for maximum rigidity against flexure and torsional stresses. Fastening of lattice framework 24 will preferably be at three points one of which (25) will be close to the center of the flat car and the other two (26) of which one only is visible will be toward the forward end of the flat car. This arrangement provides to some degree the effect of a universal joint thereby limiting transmission of strains from the flat car to the framework.

Within the framework 24 is arranged a rigid beam 27 preferably metallic. One end of beam 27 has a pivotal mounting 28 along a vertical axis in line with the pivotal axis of the forward bogie. A second support 30 at the other end of beam 27 may comprise a rack segment and is adapted to be driven by one-way mechanical drive means whereby the beam may assume various angular positions along its horizontal plane as best shown in FIG. 3.

Such angular variation should correspond to that assumed by the forward bogie relative to the flat car during passage of the latter over curved rails. The sought-after effect is the maintaining of the optical axis of the system, which is parallel to beam 27, constantly perpendicular to the radius vector of the curve being traversed. In such manner the luminous band as obtained from the light source optical system and the albedo resulting therefrom will always be perpendicular to the longitudinal axis of the tunnel even during variations of curvature of the latter.

The angular position control of beam 27 may be realised by means of an angle sensor 29 which reads the angular variations of the forward bogie axis and provides therefrom the necessary signals to a suitable servo motor to operate the rack drive mechanism.

Light source S will be located over the pivot point 28 of the beam 27, whereby the luminous trace may be considered as having its origin at this point. Although as already indicated such light source will preferably comprise a continuous halogen lamp, under certain circumstances lasers may be used where one is mainly concerned with obtaining point-to-point information, or where a CW laser might be arranged to scan the surface to be measured. In any event the design criteria for a given application must consider the sensitivity of the receiver, the nature of the surface, and where a laser is employed the safety of the operator.

The other end of the beam 27 will carry the receiver apparatus 31, which may take various forms while maintaining the principle of FIG. 1. Thus for instance a television camera tube with a large receiving surface to enhance definition may operate in conjunction with an analog-to-digital converter to provide numerical values corresponding to X and Y cartesian coordinates of the luminous changes read by the camera tube.

In a practical example scanning may be carried out at the rate of 25 image sweeps per second thereby enabling the measurement of a large number of sections and leaving relatively little of a given surface uninspected. Thus for a tunnel 200 meters in length wherein the apparatus advances at one meter per second it will be possible to read and store data for 5000 sections, i.e. for every 40 mm of the tunnel length. Obviously where less data is required there will be no problem in imposing limits and one may for instance simply look for averages at predetermined portions of the tunnel. However the great interest in the use of the camera tube in conjunction with a continuous trace resides in the fact that there will be no zones of uncertainty. As already suggested however, there are certain limitations in this method inherent in the construction of the camera tube itself wherein the resolving power d, the radius r of the receiving surface and the limits to L imposed by the length of the flat car will determine the maximum measurable radius R as well as the smallest detectable variation D. Thus it may be necessary when measuring extra wide tunnels with double tracks to make two passages in order to effect a complete measurement.

As an alternative to the camera tube there may be employed bar supports carrying a plurality of photo diodes. Such an arrangement may be preferred in the event that point-by-point inspection is sufficient. The support bars may be arranged in a manner providing the best possible compromise among known standard tunnel profiles. The same measured results may be obtained as in the case of the camera tube, however there will remain undetected zones between the incident light beams.

Figure 4:
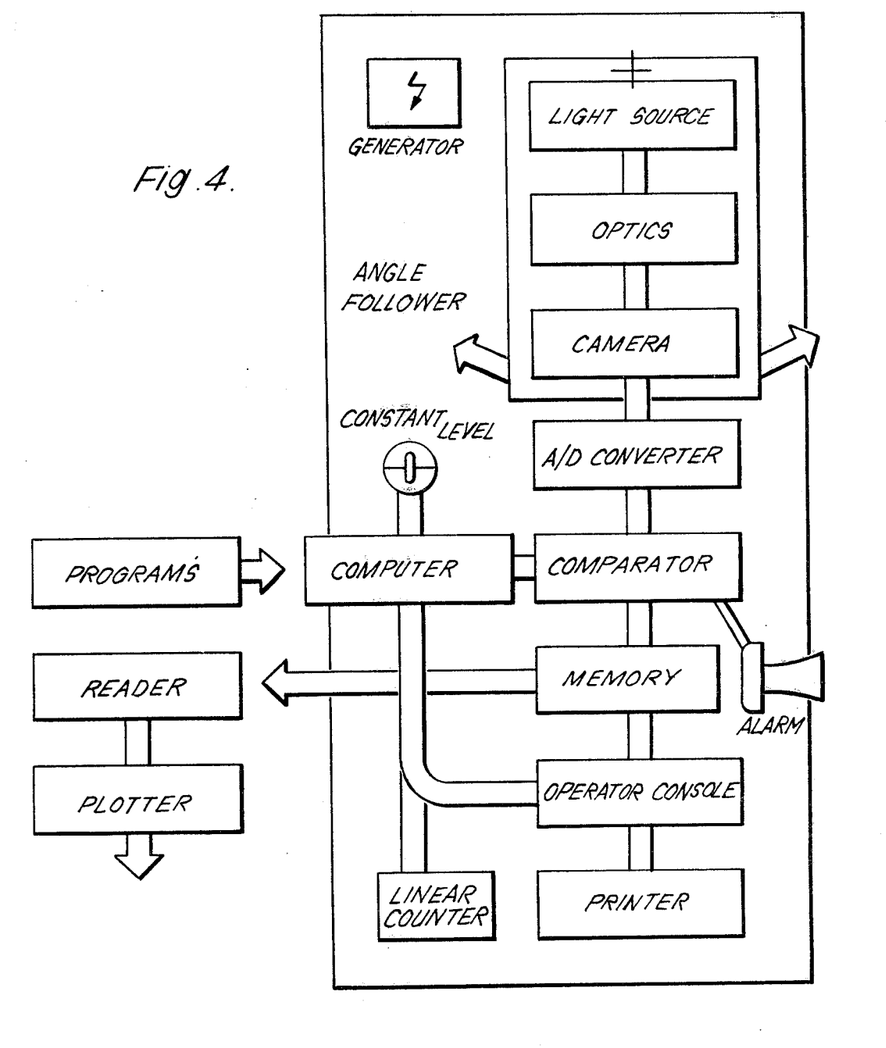
FIG. 4 is a block diagramme of the data handling system.

The data handling system as shown in block form in FIG. 4 consists for the most part of standard elements. On the flat car itself will be included most of the equipment used with the exception of perhaps a plotter which can be programmed to show graphically the tunnel profiles so that they may be compared to a standard profile. Thus, as already explained, the television camera in response to received changes in luminous traces provides corresponding analog video signals. Such analog signals are then transformed into ordered numerical values by the analog-to-digital converter.

A comparator is provided and is arranged to compare data from the A/D converter with data received from a processor in which will be stored working instructions and standard data. The result of the comparisons made will represent differences between what is desired according to the program and what exists in reality. Thus when a master gauge is being employed an alarm signal may be given in time to warn an operator of danger ahead. At the same time the information may be stored in a suitable memory.

The console enables the operator to effect control of the apparatus and to insert changes or additions to the program when desirable.

The printer provides a printed record of the activities undertaken as well as further activities associated with the data processor.

The linear counter in conjunction with the data processor enables identification of the various profiles recorded along the length of the tunnel surveyed.

The electric generator provides an independent power source for the various elements of the assembly.

The constant level element will be explained hereinafter. Further elements may be added and changes may be made according to varying circumstances. Thus it will be evident that certain variations are desirable in the event that diode bars are employed in place of the camera tube.

Figure 5:
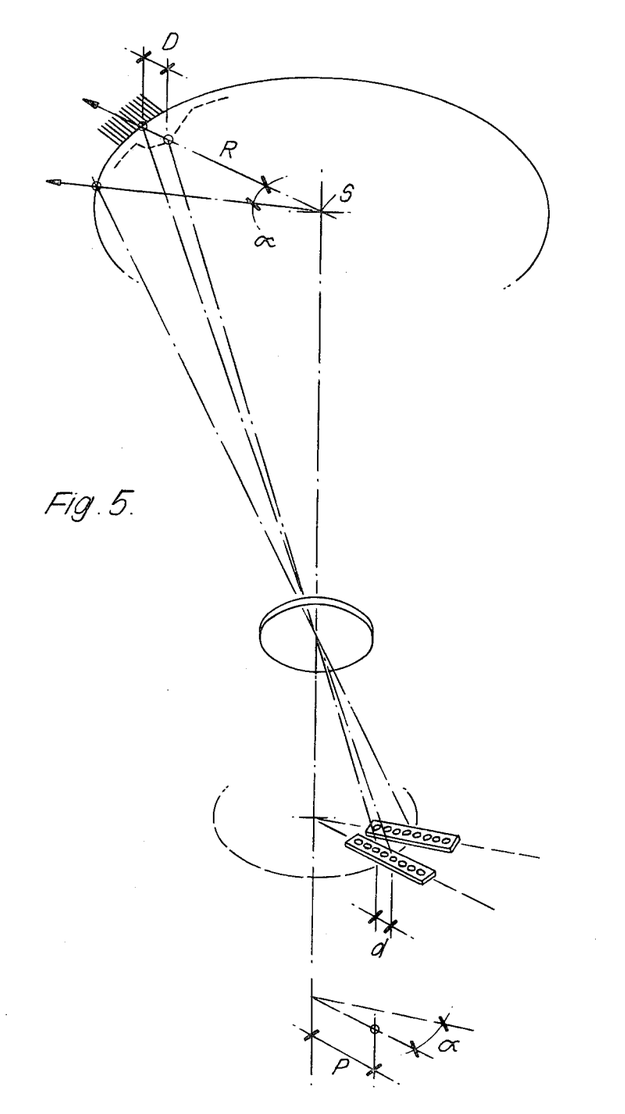
FIG. 5 illustrates the operating principle according to one embodiment.
Figure 7:
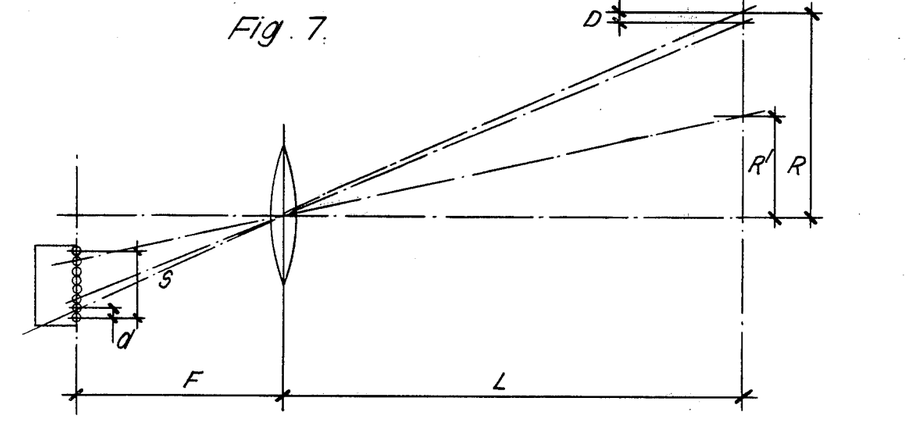
FIG. 7 shows determination of the precision according to the embodiment of FIG. 5.

Consider next FIGS. 5 and 7 showing respectively the principle of point-by-point measurement using diode bars and polar coordinates and the determination of obtainable precision employing such apparatus. The diode bars may be obtained by a process akin to that used in manufacturing integrated circuits and in a practicable example the diodes constituting said bars may be separated by a distance of 16 μm. It will be readily apparent from FIG. 5 that in the case of a point source at S which scans the tunnel wall or a plurality of fixed point sources, excitation of the outermost diode will indicate the maximum radius and excitation of the innermost diode will indicate minimum radius. Although the diode bars may be placed closely adjacent one another in a circular pattern there will nevertheless be areas along the tunnel wall which will not be measured.

As shown in FIG. 7, with a length L measured from light source S to lens O of 9 meters, a maximum admissible radius of measure R of 10 meters, a minimum admissible radius R' of 2.50 meters and a target diameter T of 29 mm. the optical relationship will be $$\frac{R-R'}{T} = \frac{L}{F} \text{ thus } \frac{7,500}{29} = \frac{9,000}{F}$$

and

F=35 mm.

In theory the smallest detectable deformation D will be $$D/d = L/F$$

or $$D/0.016 = 9,000/35$$

from whence D=4 mm.

From the foregoing it will be realised that with a target diameter of 29 mm. and a resolution of 16 μm each diode bar will require in theory 1812 diodes. In practice it has been found useful to provide bars having 30 additional diodes at each end for a total of 1872.

With the foregoing arrangement each profile may be measured in 50 ms, thus if the transport advances at 1 meter per second, data for 20 profiles may be obtained and stored for each meter along the path, that is one profile each 50 mm.

Figure 6:
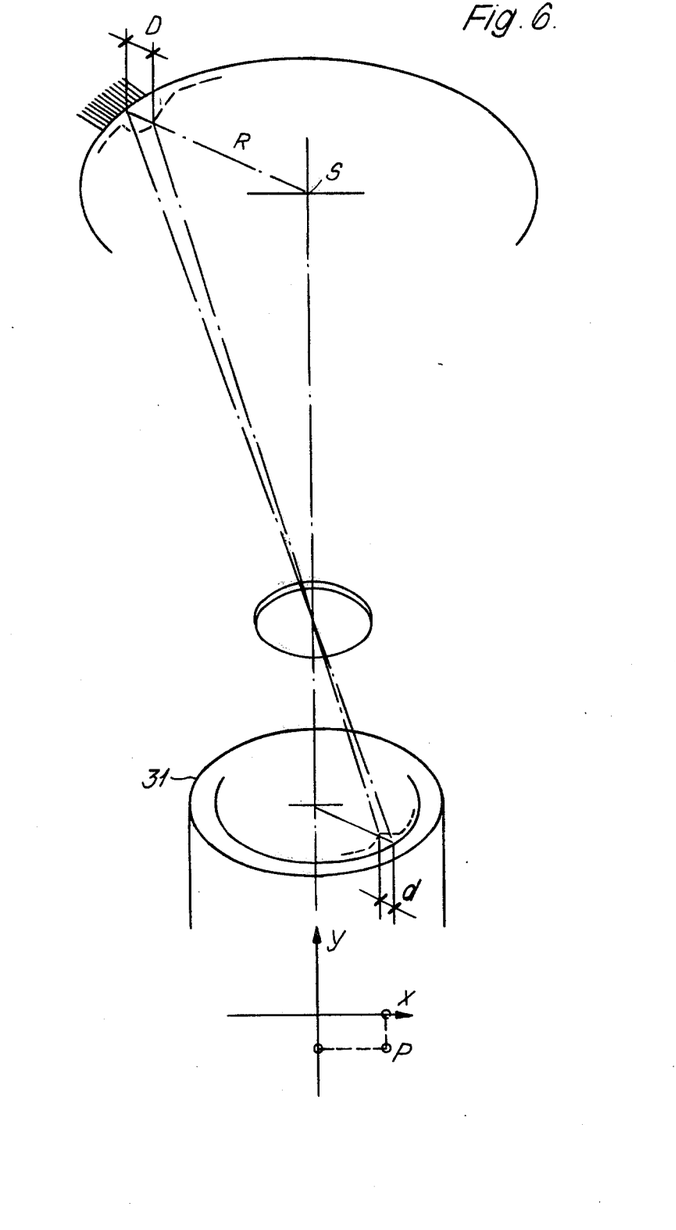
FIG. 6 illustrates the operating principle according to a second embodiment.

In the case of the system as initially explained in respect of FIG. 1, i.e. with a continuous trace and a video camera tube adapted to perform the scanning the arrangement may be as shown in FIG. 6. Herein the analysis is obtained in terms of cartesian rather than polar coordinates and as already set forth, the surface to be measured is entirely explored. FIG. 6 shows this arrangement with the receiver 31 in the form of a video camera tube and S a continuous light source as already described.

Figure 8:
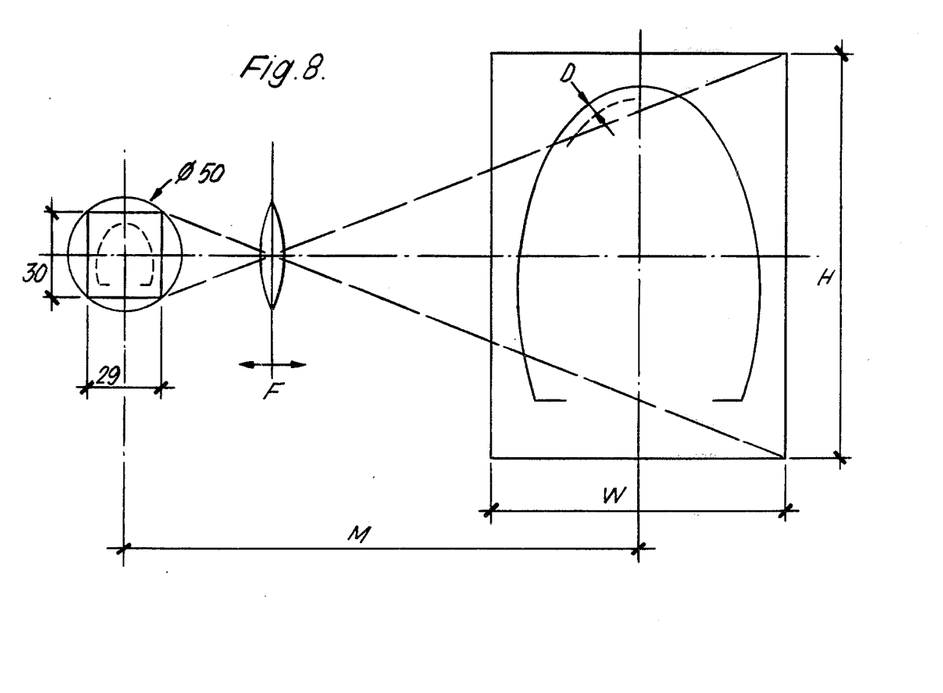
FIG. 8 shows determination of the precision according to the embodiment of FIG. 6.

In determining the precision obtainable with the apparatus of FIG. 6, FIG. 8 shows the parameters to be considered:
Thus
 φ=camera surface effective diameter=50 mm
 dimensions of the image aperture=39×29 mm
 resolving power in X and Y=50 μm
 overall optical path length M=9 meters
 zoom lens focal length F=30–80 mm The detecting power is inversely proportional to the focus utilised. Thus $$(M-F)/F = D/d = H/39 = W/29$$

and so if
 F=30 mm, D=15 mm, H=12 meters, W=9 meters.
 F=80 mm, D=5.57 mm, H=4.34 meters, W=3.23 meters.
 F=60 mm, D=7.45 mm, H=5.80 meters, W=4.32 meters.

It is possible in view of the image aperture to choose an optical enlargement such as to permit the maximum detecting power.

The dispersion between two measurements will be about 0.5% of φ.

In the present instance it will be possible to obtain data for 25 profiles per second, that is to say one profile for each 40 mm of tunnel length.

MEASURING METHODS

Figures 9, 10, 11:
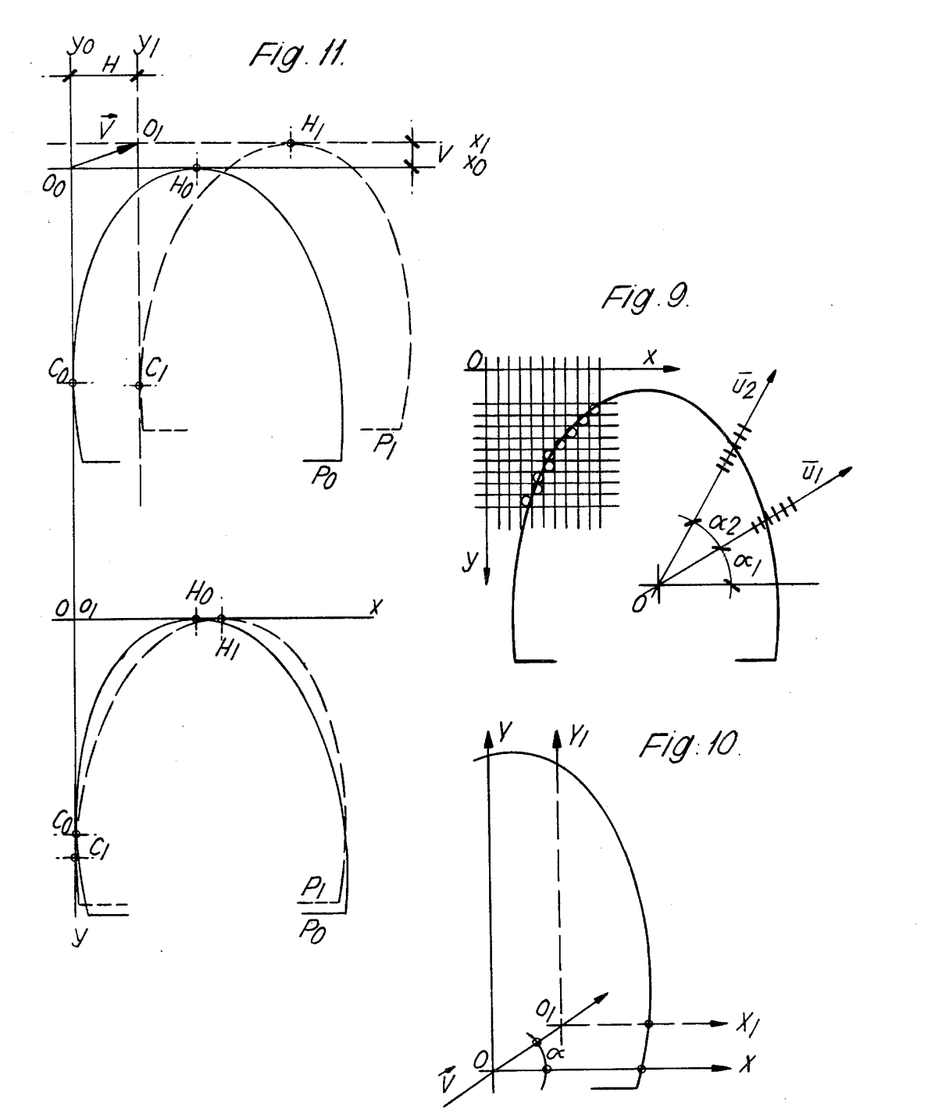
FIGS. 9, 10, 11 and 12 show how profile deformations are measured.

The mathematical description of a predetermined profile $P_o$ measured at a time $T_o$ may be summarized as a series of points $A_o$ determined relative to an origin $O_o$ and which may be specified in digital form suitable for storage in a memory. FIG. 9 shows two of the possible arrangements, notably the cartesian system where each point is specified by X Y number pairs corresponding to cartesian coordinates and the polar system wherein the number pairs may correspond to radius vectors $\overline{V}_1 \overline{V}_2$, etc., and angular displacements $\alpha_1 \alpha_2$, etc., as used in polar coordinate systems.

For various reasons, i.e. settling of the track or road bed, tamping down of the ballast, the image furnished by a light source S may undergo a displacement designated for instance by a vector $\vec{V}$ and a new series of recorded points $A_1$ will be determined relative to a new origin $O_1$ at a new time $T_1$.

In order to determine whether or not there are deformations, i.e. by comparing the series $A_o$ with the series $A_1$ it will first of all be necessary to determine the vector $\vec{V}$ in order to bring about a coincidence between two profiles $P_o$ and $P_1$. Failure to obtain such coincidence will indicate the presence of deformations.

Using the polar coordinate system as recommended for analysis in conjunction with diode bar receptors, FIG. 10 shows that from origin O the system O Y X may be displaced to $O_1$ $Y_1$ $X_1$ by radius vector $\vec{V}$ at an angle $\alpha$. By measuring and calculating according to the formula $$\Sigma = \sqrt{(x-x_1)^2 + (y-y_1)^2}$$

for several vectors a series $\Sigma_o \Sigma_1 \Sigma_2$ may be determined; the best adaptation will be obtained when one arrives at a $\Sigma$ of minimum value. Thus starting at origin O the vector $\vec{V}$ is determined such that on displacement of the system O Y X the best adaptation of two profiles is found. Deformations are then measured through point-by-point comparisons.

FIG. 11 shows the measurement method using cartesian coordinates as best adapted to measurement and analysis using a video camera receptor.

Thus for profiles $P_o$ and $P_1$ the following points are determined:
 $H_o$ and $H_1$ corresponding to the maximum height of the image. The distance V thus obtained is equal to the vertical component of the vector $\vec{V}$.
 $C_o$ and $C_1$ corresponding to the greatest horizontal distance. The distance H thus obtained corresponds to the horizontal component of vector $\vec{V}$.

Having thus obtained vector $\vec{V}$, the ready superposition of the cartesian coordinate axes $X_o Y_o$ and $X_1 Y_1$ will show coincidence or lack thereof between the two profiles $P_o$ and $P_1$.

Figure 12:
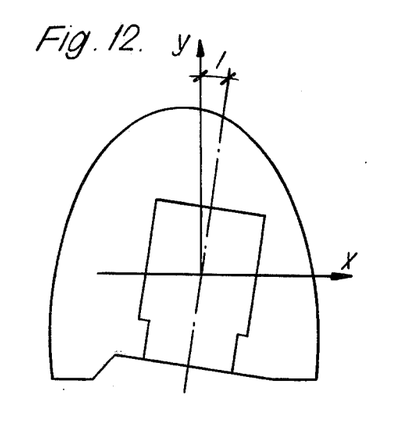

In either of these systems it is necessary to have a reference point in order to assure consistency in the measurement procedures between the actuality represented by the tunnel being measured and the sensing equipment installed on the flat car. For example in the case of curved tunnels, banking of the rails or road bed will cause inclination of the sensing equipment as noted for example in FIG. 12.

Thus it becomes necessary to provide level sensing equipment as mentioned previously in respect of FIG. 4. This equipment measures at all times the amount of inclination and provides signals representative of such inclination to the data processor. The processor then uses the inclination data to correct the information received from the tunnel profile measuring equipment so that such information is automatically and immediately converted to refer to a standard origin and coordinate axes.

Figure 13:
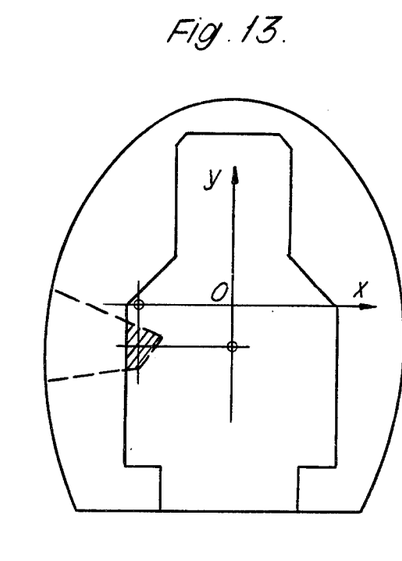
FIG. 13 shows inspection based on a master gauge.

FIG. 13 shows master gauge inspection wherein the stored program considers only the master gauge defined at the beginning of the operation. To the extent that this is not disturbed by the sudden appearance of a luminous transition in the surface thereof, nothing will take place within the data handling equipment. Should however such a transition occur owing to a protuberance within the tunnel being illuminated by the optical system the alarm is immediately set off. At the same time data concerning the protuberance may be stored in the memory whereby it may be precisely located relative to the master gauge and the exact section of tunnel.

What is claimed is:

1. A device for the measurement of interior profiles of an elongated enclosed space in which, as said device is moved longitudinally along said enclosed space on a transport means, an image analyser is optically coupled to a light source via the profile to be measured in a manner to assure a predetermined proportionality between the dimensions of a projected image on the image analyser and those of the profiles to be measured, said light source being associated with a first means adapted to project a continuous collimated band of light toward said profile and second means in association with said first means adapted to change the horizontal angular position of said first means relative to said transport means whereby said collimated band maintains a substantially constant angle of incidence with said profile as said transport means moves along said elongated enclosed space.

2. A device as set forth in claim 1 wherein the enclosed space comprises a railway or road tunnel.

3. A device as set forth in claim 2 wherein the image analyser, the first means, and the light source are mounted on said second means whereby a series of interior profile measurements may be obtained over the length of the tunnel.

4. A device as set forth in claim 3 wherein said transport means is in the form of a flat car provided with bogies so as to move over rails.

5. A device as set forth in claim 4 wherein said second means is a horizontally pivotable beam arranged on said flat car to bear the light source over the pivot point thereof and image sensing means proximate an end thereof remote from said pivot point.

6. A device as set forth in claim 5 wherein the pivot-point of said beam corresponds to the pivot point of the forward bogie.

7. A device as set forth in claim 6 wherein angle sensing means is associated with said forward bogie so as to provide signals indicative of the horizontal angle assumed by the bogie in respsect of the flat car longitudinal axis whenever the flat car traverses a curved section of rails.

8. A device as set forth in claim 7 wherein the end of the beam bearing the image sensing means has servo mechanism associated therewith responsive to the signals from the angle sensing means whereby the axis of the beam is maintained approximately parallel to the tunnel axis to thereby maintain said constant angle of incidence of said collimated band with said profile.

9. A device as set forth in claim 3 and having level means associated with said transport means to detect and measure any angular deviation of a horizontal surface of said transport means from a true horizontal.

10. A device as set forth in claim 9 including data processing means responsive to signals from said level means to effect automatic correction of data received by said image analyser.

11. A device as set forth in claim 1 wherein said light source comprises at least one halogen lamp, and optics adapted to direct a narrow collimated band of light from said halogen lamp toward said profile.

12. A device as set forth in claim 1 wherein is further included a third means adapted to detect variations of said light source from a predetermined vertical angle and to provide correction signals to said image analyser.

* * * * *